United States Patent [19]

Hall

[11] 4,216,803
[45] Aug. 12, 1980

[54] SELF-SEALING FUEL LINES

[75] Inventor: Charles A. Hall, Lakewood, Colo.

[73] Assignee: Martin Marietta Corporation, Rockville, N.Y.

[21] Appl. No.: 966,216

[22] Filed: Dec. 14, 1978

Related U.S. Application Data

[63] Continuation of Ser. No. 696,409, Jun. 15, 1976, abandoned.

[51] Int. Cl.² ............................................. F16L 9/14
[52] U.S. Cl. ................................... 138/144; 138/153; 138/143; 138/172; 428/912; 220/71; 220/83
[58] Field of Search ............... 138/140, 137, 144, 127, 138/129, 130, 153, 139, 143, 172; 150/0.5; 220/71, 83; 428/912

[56] References Cited

U.S. PATENT DOCUMENTS

| | | | |
|---|---|---|---|
| 2,401,627 | 6/1946 | Eger | 220/63 A |
| 2,407,515 | 9/1946 | Roberts | 428/912 X |
| 2,438,965 | 4/1948 | Dasher | 428/912 X |
| 2,439,366 | 4/1948 | McLaughlin | 220/63 A |
| 2,446,811 | 8/1948 | Crawford | 220/63 A X |
| 2,446,815 | 8/1948 | Davies et al. | 220/63 A X |
| 3,062,241 | 11/1962 | Brumbach | 138/125 |
| 3,509,016 | 4/1970 | Underwood et al. | 220/63 A |
| 3,604,461 | 9/1971 | Matthews | 138/137 |
| 3,698,587 | 10/1972 | Baker et al. | 220/63 A X |
| 3,728,187 | 4/1973 | Martin | 220/452 X |
| 3,830,261 | 8/1974 | Hochberg et al. | 138/127 |
| 3,901,281 | 8/1975 | Morrisey | 220/460 X |
| 3,980,106 | 9/1976 | Wiggins | 138/140 |
| 3,988,188 | 10/1976 | Johansen et al. | 138/126 X |

*Primary Examiner*—Richard E. Aegerter
*Assistant Examiner*—James E. Bryant, III

[57] ABSTRACT

A puncture sealing apparatus for handing a fluid such as aircraft fuel, and a method for manufacturing a puncture sealing apparatus for handling a fluid. A metallic tubular member is provided which defines a chamber for the fluid; the metallic tubular member being constructed of a material which tends to deform outwardly upon a projectile exiting the chamber. A layer of puncture sealing material is disposed in covering relation to the metallic tubular member. An overwrap of filament material is wound directly onto the metallic tubular member in a predetermined winding pattern, and at a predetermined wrap tension, and the coating of puncture sealing material is disposed in covering relationship to the overwrapped metallic tubular member. The overwrap material, particularly at the disclosed wrap pattern and wrap tension, is effective to force portions of the metallic tubular member inward of the coating of puncture sealing material upon the exiting of a projectile from the chamber, to thereby allow the puncture sealing coating to seal the puncture without interference due to metal deformation.

7 Claims, 5 Drawing Figures

FIG 4
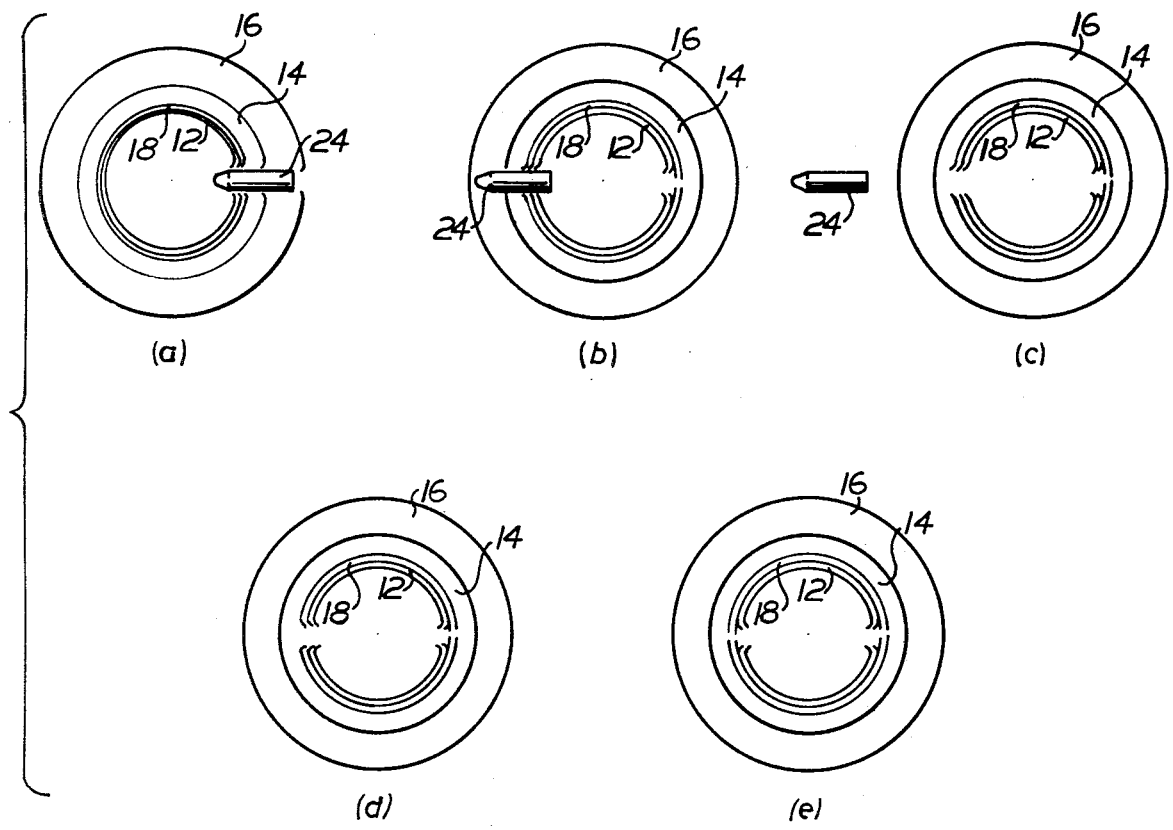
(a) (b) (c)
(d) (e)
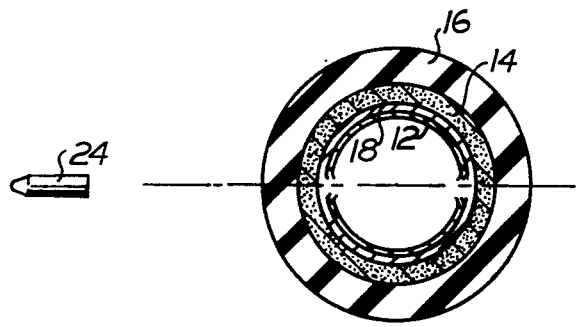
FIG. 5

SELF-SEALING FUEL LINES

This is a continuation of application Ser. No. 696,409 filed June 15, 1976 now abandoned.

BACKGROUND OF THE INVENTION

This application relates generally to puncture sealing fluid handling apparatus of the type which have a metallic tubular member forming a chamber for the fluid and a puncture sealing material covering the metallic tubular member. It relates particularly to fluid handling apparatus which is designed for use as fuel lines in military jet aircraft. There are numerous instances in which aircraft fuel lines might be pierced by a projectile (such as a bullet) which penetrates the aircraft fuselage. A pierced fuel line which allows its contents to continuously leak out of the puncture hole can have disastrous results.

Therefore, it has been conventional to design aircraft fuel lines with the capacity to be puncture sealing, in order to maintain the integrity of the fuel line even if it is pierced by a projectile. One very common way of constructing a puncture sealing fuel line has been to coat a metallic tubular inner member with a layer of material such as gum rubber. When the fuel line is pierced by a projectile the gum rubber tends to swell and fill the hole caused by the projectile, to thereby seal the hole against leakage of fluid.

Applicant has found that fuel lines constructed in the foregoing manner have certain disadvantages in sealing against a projectile which pierces the fuel line at one point and exits the fuel line at another point. Specifically, when a projectile exits the fuel line it tears through the metal tubing and deforms portions of the metal tubular member outwardly, a phenomenon known as petalling. The metal portions tend to penetrate deeply into the gum rubber and remain there. This means that if the layer of gum rubber is not as thick as the longest petals the gum rubber will not be able to effectively seal the puncture. This also means that in designing a fuel line to withstand penetration by a particular sized projectile the thickness of the gum rubber layer must be greater than the extent of the longest petals which are likely to be caused by such a projectile. This latter situation is believed to be particularly disadvantageous from a weight point of view.

Examples of other known forms of puncture sealing fluid conduits or containers can be found in disclosures such as U.S. Pat. Nos. 3,509,016; 3,291,333; 3,379,336; 2,429,688; 2,403,836 and 3,698,587.

SUMMARY OF THE INVENTION

The present invention relates to the manufacture of fluid handling apparatus of the type in which a fluid chamber is formed by a metallic tubular member and the metallic tubular material is coated with a puncture sealing composition (e.g., gum rubber). According to the present invention, there is provided a means interposed between the metallic tubular member and the coating of the puncture sealing material and which is effective to force the metal tubular member inwardly of the puncture sealing covering as the projectile exits from the chamber, with the result that metal petals do not protrude into the puncture sealing material, and the puncture sealing material is thereby free to perform its puncture sealing function.

According to one feature of the invention the metallic tubular member is overwrapped with filament material wound directly onto the metallic tubular member in a predetermined pattern, and the puncture sealing material is disposed in covering relation to the overwrapped tubular member. The overwrap is wound in alternating helically disposed layers, each helically disposed layer being wound at a lead angle of from 5 to 30 degrees.

In another feature of the invention the filament material is wound about the metallic liner at a wrap tension which places the overwrap material in a predetermined state of tension. In this state the filament is particularly effective in forcing the metal metallic tubular member inward of the puncture sealing material when a projectile exits from the chamber.

The overwrap material is preferably filament material such as fiberglas, Kevlar or graphite and which has been pre-impregnated with a suitable resin. These materials, in a pre-impregnated state, have been found to have extremely good compatability with the preferred materials forming the metallic tubular member for forming an overwrap which performs in the intended manner.

Yet another feature of the present invention relates to a method of constructing a fluid handling apparatus which forms part of a puncture sealing fluid conduit or container. A metallic member is formed in a generally tubular shape to form a fluid chamber, the metallic tubular is overwrapped by filament material in a predetermined winding pattern and at a predetermined wrap tension, the overwrapped metal metallic tubular member being then in a condition to be covered with a puncture sealing material (e.g., gum rubber). The winding of filament material preferably includes the winding of resin pre-impregnated filament material in alternately directed helically wound layers, each helically wound layer being disposed at a lead angle of from 5 to 30 degrees. The selected fialment materials are designed to be particularly compatible with the selected metallic materials to form a composite fluid handling apparatus which, when coated with conventional puncture sealing material is believed to provide a container or conduit which effectively seals itself against projectile punctures, particularly during the exiting of a projectile from the fluid conduit or container.

BRIEF DESCRIPTION OF THE DRAWINGS

The further objects and advantages of the present invention will become further apparent from the following detailed description taken with reference to the accompanying drawings wherein:

FIG. 4 views a through e, illustrate schematically the manner in which a fluid handling apparatus according to the present invention promotes puncture sealing of a conduit as the fluid handling apparatus is penetrated by a projectile; and FIG. 5 is a cross sectional view fo a fuel line employing the principals of the invention, after a projectile has exited from the fuel line.

DETAILED DESCRIPTION OF THE PREFERRED EMBODIMENT

As noted above, one particularly advantageous application of the principles of the present invention relates to the composition and manufacture of puncture sealing fuel lines, such as the types commonly used for military jet aircraft. Therefore, the principles of the present invention are described hereafter as they may be employed in connection with such a fuel line. However, from the description which follows, the manner in which the present invention may be employed in connection with the construction of numerous types of fluid conduits or containers will become readily apparent to those ordinary skilled in the art.

Figure 1:
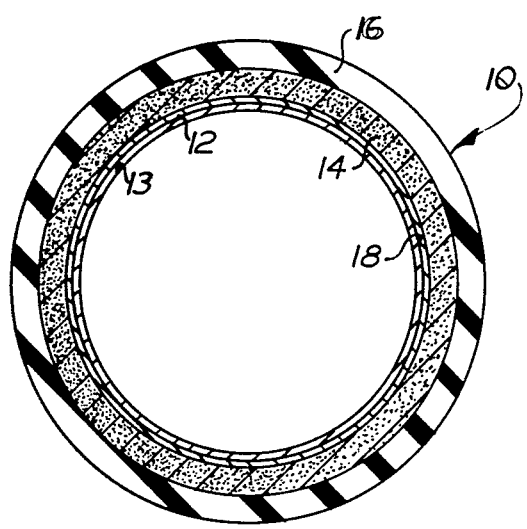
FIG. 1 is a cross sectional view of a puncture sealing fuel line constructed in accordance with the principles of the present invention.

Referring to FIG. 1, a fuelline 10 includes a cylindrical tubular metallic member 12 having an inner wall 13 defining a fluid chamber. A layer of a puncture sealing material 14 (e.g., gum rubber or the like) is disposed in covering relation to the inner metallic tubular member 12. The layer of puncture sealing material 14 possesses the necessary qualities for sealing a puncture formed in the fuel line. The particular type of puncture sealing material used may be any conventional puncture sealing material which is commonly used in the sealing of fuel lines. Also, as is conventional with aircraft fuel lines, the combined metallic tubular member 12 and the layer of puncture sealing material 14 are further surrounded by a tire cord-like cover 16, which is of conventional construction in the fuel line art.

According to the present invention means are interposed between the metallic tubular member 12 and the puncture sealing coating 14 for forcing the metallic tubular member inwardly of the coating of puncture sealing material 14 in response to a projectile piercing the fuelline and exiting from the fluid chamber. In the disclosed embodiment the means for forcing the metallic tubular member inwardly takes the form of an overwrap 18 formed of filament material wound directly onto the tubular metallic liner 12 in a predetermined pattern and at a predetermined tension. The filament material is preferably of a type which remains elastic until failure, as explained more fully hereinafter.

Figure 2:
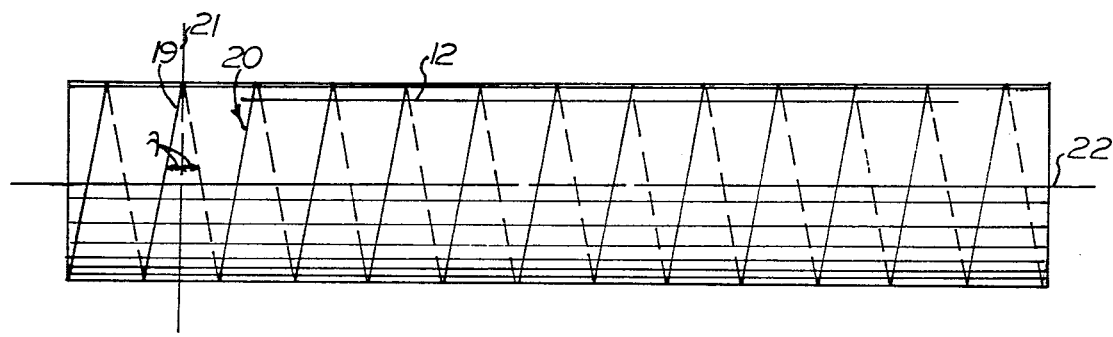
FIG. 2 is a side perspective view of a metallic tubular member being wound with filament material according to the present invention.
Figure 3:
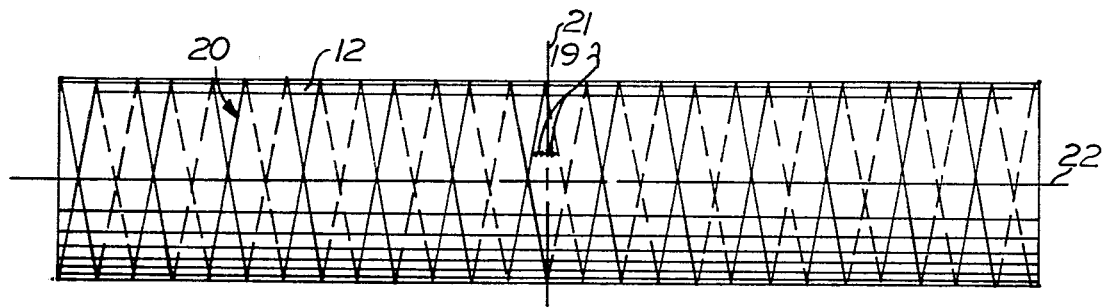
FIG. 3 is a side perspective view of a metallic tubular member being wound with filament material at a later winding stage than the metallic tubular member shown in FIG. 2.

FIGS. 2 and 3 illustrate the pattern for winding filament material 20 about the metallic tubular member 12 to form the overwrap 18. The filament material 20 is preferably pre-impregnated with resin material and allowed to partially cure (B-stage) prior to being wound about the metallic tubular member. The machine for performing the winding operation may be any of the conventional machines for winding resin pre-impregnated filament about a tubular member. The winding machine forms no part of this invention and need not be described in any further detail.

The winding of filament material about the tubular metallic member is accomplished through the winding of alternate helically disposed layers, each layer being wound in an opposite direction from the preceding layer. For example, FIG. 2 illustrates the pattern for winding a helically disposed layer of filament material 20 in a first direction (i.e., from left to right) over the longitudinal extent of the tubular metallic member 12. The winding pattern is such that the lead angle $\lambda$ (e.g. the angle between the filament helix 19 and a plane 21 perpendicular to the center line 22 of the tubular member 12) is at a predetermined angle from 5 to 30 degrees (lead angles of 10°, 15° and 20° have been found particularly desirable).

Once the first layer of filament has been wound over the longitudinal extent of the tubular metallic member 12 the winding direction is reversed and a second layer of filament is helically wound over the first layer but in the opposite longitudinal direction (i.e., from right to left in FIG. 3) and at the same lead angle. Once this second layer is completed, a layer of the filament is helically wound in the first direction and at the same lead angle, but slightly offset from the preceding layer wound in that direction. Similarly, the helical winding pattern is then repeated in the opposite direction but slightly offset from the preceding layer wound in the opposite direction. The helical winding pattern is repeated until the alternately wound helical layers eventually serve to cover (or overwrap) the entire metallic tubular member 12.

In wrapping the filament material it has been found most desirable that helical windings in both directions be effected at a lead angle of from 5 to 30 degrees. It has also been found that in winding the preferred types of filament materials it is important to maintain a winding tension of 2–4 pounds per 20 ends of filament material. With filament materials of the preferred types the aforesaid wrap tension and winding pattern places the filament material, which remains elastic until failure, in a state in which, when a projectile exits the fluid chamber, the overwrap snaps back with enough energy to force the deformed portions of the metallic tubular member (i.e. the metal petals) substantially inwardly of the coating of puncture sealing material.

In the manufacture of a fuel carrying line in accordance with the principles of the present invention the initial step involves the construction of the metallic tubular member. It is contemplated that any of the materials which are conventionally used to form a metallic tubular member for a fuel line (e.g., Inconel 718, aluminum and stainless steels) may be used. Any of the known construction techniques for forming the metal into the shape of the tubular member 12 may be used.

Next, the metallic tubular member is overwrapped with filament material. It is important in the determination of suitable filament material that the material should have a higher modulus of elasticity than the metal forming the tubular member 12, and the filament material should also be of the type which remains substantially elastic until failure. Three types of filament which have been found to be particularly compatible with the preferred metal materials are fiberglas, Kevlar, and graphite.

It is important that the filaments be fully pre-impregnated with resin prior to being wound about the liner, and after resin impregnation and before winding the filament material must be allowed to partially cure (B-stage) for a sufficient enough period to preclude resin migration during the overwrapping sequence. The curing period may vary in accordance with the selected filament and resin (as well as the curing temperature and atmosphere) as will be readily apparent to those of ordinary skill in the art.

After the pre-impregnated fibers have been allowed to partially cure (B-stage) sufficiently, the filament material is wound around the metallic tubular member. The winding maching used may be any winding machine which is conventionally used to wind resin inpregnated filament about a tubular member. With the winding tension controlled at from 2 to 4 pounds per 20 ends of material, the filament material is first wound in a helical pattern over the length of the metallic tubular member 12 in the manner shown in FIG. 2 to form a first layer. Reversal of the winding pattern such as shown by FIG. 3 is then effected with the helical pattern disposed over the original helical pattern and inclined at the same lead angle but in the opposite direction to form a second layer. Once the second layer is completed another helical layer is wound again in the first direction with the beginning loop being very slightly displaced in an axial direction from the beginning loop of the first layer. Similarly, another helical layer is then wound in the opposite (or second) direction with the beginning loop slightly displaced in an axial direction from the beginning loop of the previous layer wound in the second direction. This process continues with the winding back and forth of helically disposed layers of filament material until the metallic tubular member 12 is completely overwrapped with filament material.

The metallic tubular member overwrapped is then cured at an elevated temperature, with the metallic tubular member being pressure stablized from within, the cure temperature depending upon the type of resin used. Once the overwrapped metallic tubular member has been cured a coating of puncture sealing material is applied in a conventional fashion, and the composite fuel line is then overwrapped with a tire cord-like layer, also in a conventional fashion.

FIGS. 4a through 4e illustrate the manner in which the overwrapped metallic tubular member 12 according to the invention functions when punctured by a projectile 24. During entry of the projectile 24 into the fluid chamber (FIG. 4a) the portions of the metallic tubular member are plastically deformed and are forced inwardly. The filament overwrap 18, which is still in its elastic range, flexes as it is pierced by the projectile, and then returns substantially to its original set. Since the metallic tubular member deforms inwardly as the projectile enters the chamber the puncture sealing coating 16 is free to perform its puncture sealing function.

As the projectile exits from the chamber, (FIG. 4c), portions of the metallic tubular member are initially forced outwardly, as is the overwrap material. However, the overwrap material, being in its elastic range and being under the predetermined wrap tension then snaps back with enough energy to force the metal portions back inwardly of the puncture sealing coating 16 (FIG. 4d). The overwrap returns substantially to its original set and the metal portions, being in their plastic range, remain substantially inward of the puncture sealing coating (FIG. 4e). The puncture sealing material 16 outside of the overwrap is therefore in a condition in which it performs its puncture sealing function without interference from the metal portions. FIG. 5 illustrates the approximate disposition of the elements of the fuel line after the projectile has exited from the fuel line.

A fuel line manufactured according to the present invention has numerous advantages over a fuel line constructed in the conventional manner with only a metal tubular member and puncture sealing coating. As noted above, a primary advantage is that the metal portions are prevented from becoming embedded in the puncture sealing material when a projectile exits from the fuel line.

A fuel line manufactured according to the invention also has a weight advantage over conventional fuel lines. The metal liner of a conventional fuel line can be replaced by an overwrapped metallic tubular member of substantially similar thickness. The filament overwrap (which is preferably approximately 7 times as thick as the metallic tubular member) is less dense than the metal, and the overwrapped metallic tubular member is therefore lighter in weight than a metal tubular member of similar thickness. Additionally, an overwrapped metallic tubular member means that less thickness of puncture sealing material is required than for a metallic tubular member which is not overwrapped. And with a thinner puncture sealing material coating the overall envelope of the fuel line is reduced, thus providing an additional advantage since aircraft space is limited.

While the preferred embodiment of the invention has been disclosed as it relates to military aircraft fuel lines, it is believed that a puncture sealing casing constructed according to the invention may have other applications. For example, hydrazine lines (particularly in ground test systems), spacecraft propellant lines, commercial airline fuel lines, and above ground fuel lines (such as the Alaskan pipeline) might all be protected from puncture damage by being constructed in accordance with the invention. Also, while the preferred embodiment relates to fluid carrying conduits, the principles of the invention may be also applied to fluid containers which employ a metallic tubular member covered with a layer of puncture sealing material.

Thus, in view of the foregoing disclosures the obvious applications of the present invention will become readily apparent to those of ordinary skill in the art.

What is claimed is:

1. A self-sealing structure for handling a fluid comprising a metallic inner member defining a chamber for receiving the fluid, a layer of sealing material disposed in surrounding relation with and spaced from the outer periphery of said metallic inner member for sealing a wound caused by a projectile piercing through the structure, an overwrap disposed directly between and in contact with said metallic inner member and said layer of sealing material for forcing portions of the metallic inner member inward after a projectile exits from the chamber, said overwrap consisting essentially of a plurality of layers of a filament of material extending around said metallic inner member in a state of tension of at least about 2 pounds per 20 ends of material and embedded in a resin matrix, each layer of said filament of material being disposed at a helix angle across the length of the metallic inner member, each succeeding layer of said filament of material being disposed at the same helix angle but in the opposite direction as the preceding layer and being disposed on top of the preceding layer across the length of the metallic inner member, each of said layers of said filament of material being of a thickness corresponding to the thickness of said filament of material, and said filament of material being of a type which remains substantially elastic until failure, whereby when a projectile exits from the chamber the state of tension in the filament material of each of said layers is maintained and the overwrap forces portions of said metallic member which would otherwise embed in the puncture sealing material back inwardly of said overwrap.

2. Apparatus as set forth in claim 1 wherein said filament material includes a filament comprising a plurality of fibers (ends) of material, said filament being wound about said metallic inner member in a state of tension of from 2-4 pounds per 20 ends of material.

3. Apparatus as set forth in claim 2 wherein said filament comprises fiberglass.

4. Apparatus as set forth in claim 1 wherein said filament material is disposed in helically oriented layers about the cylindrical outer wall of the metallic inner member at a lead angle of from 5 to 30 degrees.

5. Apparatus as set forth in claim 4 wherein said filament material is disposed in helically oriented layers alternately disposed in opposite longitudinal directions each layer overlying the preceding layer across the entire length of the metallic inner member, with the lead angle of the helically disposed layer in either direction being from 5 to 30 degrees.

6. Apparatus as set forth in claim 1 wherein said filament material comprises Kevlar.

7. Apparatus as set forth in claim 1 wherein said filament material comprises graphite.

* * * * *

UNITED STATES PATENT AND TRADEMARK OFFICE
CERTIFICATE OF CORRECTION

PATENT NO. : 4,216,803
DATED : August 12, 1980
INVENTOR(S) : Charles A. Hall

It is certified that error appears in the above-identified patent and that said Letters Patent are hereby corrected as shown below:

Item [73] on title page should read:

"Martin Marietta Corporation, Rockville, Maryland"

Signed and Sealed this

Thirtieth Day of December 1980

[SEAL]

Attest:

SIDNEY A. DIAMOND

Attesting Officer

Commissioner of Patents and Trademarks